(No Model.) 3 Sheets—Sheet 1.
J. G. ZELLER.
CONVEYER.
No. 510,626. Patented Dec. 12, 1893.
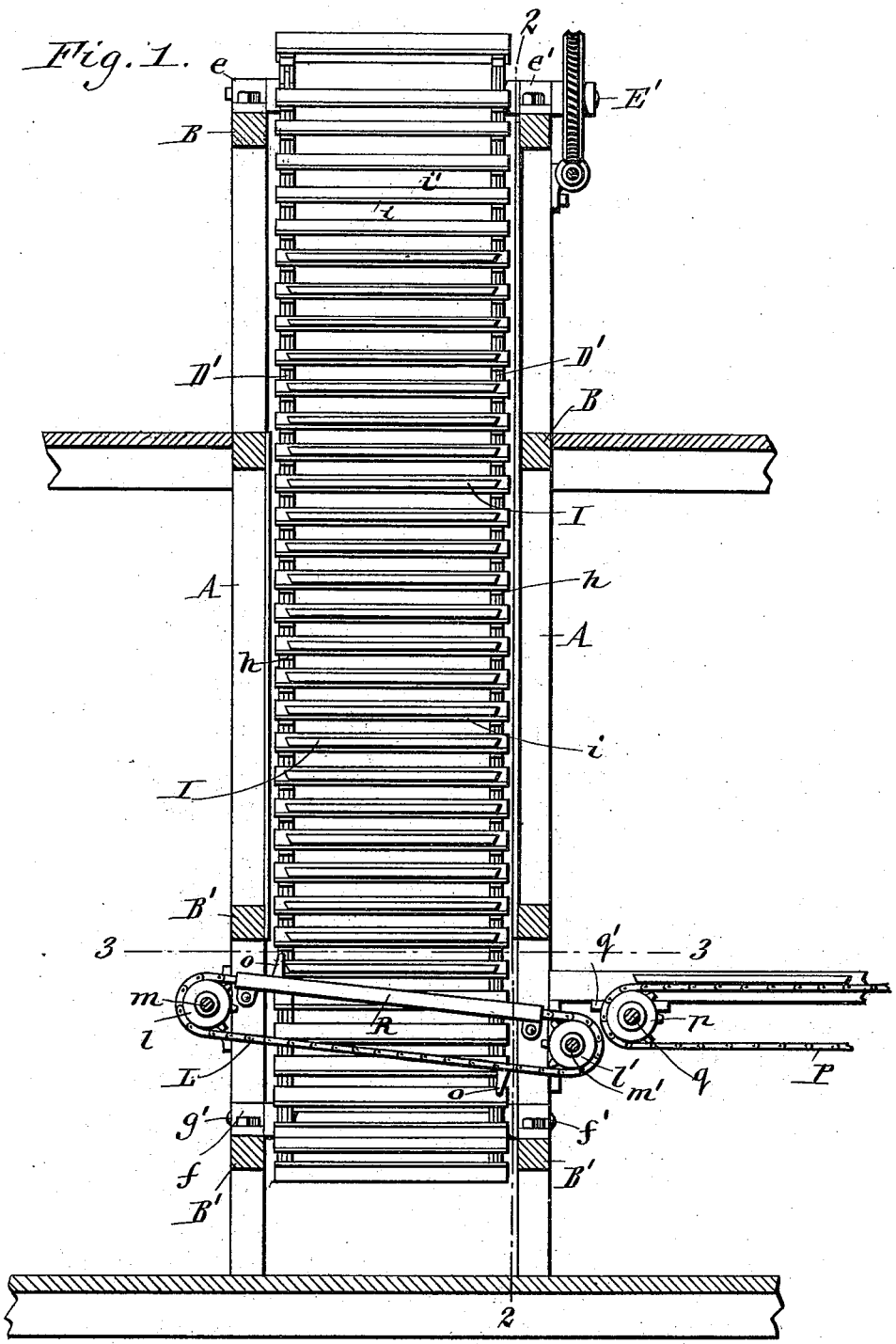
Witnesses:
Theo. L. Popp.
Chas. F. Burkhardt.
John G. Zeller, Inventor.
By Wilhelm Bonnet.
Attorneys.

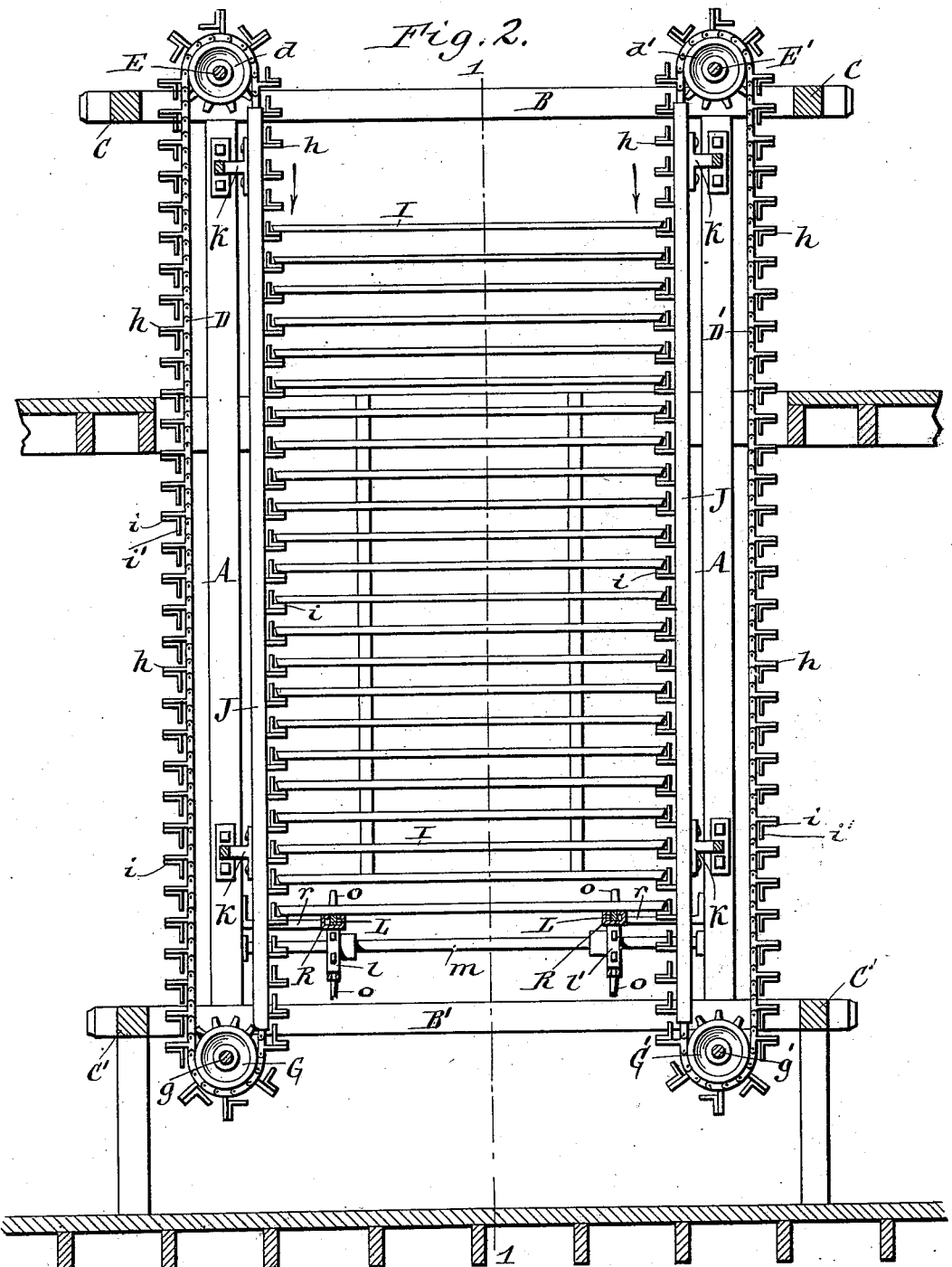

(No Model.) 3 Sheets—Sheet 3.
J. G. ZELLER.
CONVEYER.
No. 510,626. Patented Dec. 12, 1893.
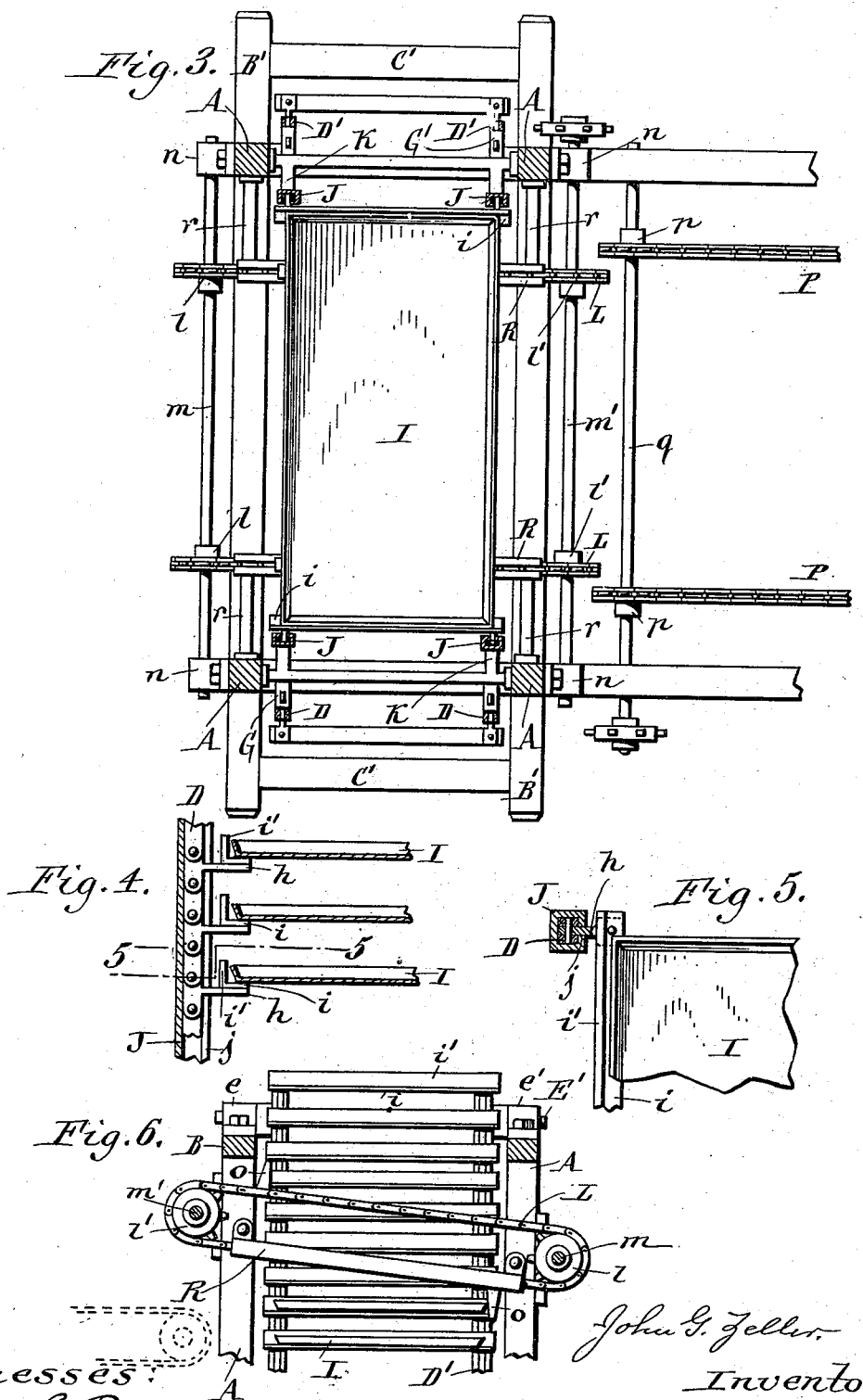
Witnesses:
Theo. L. Popp
Chas. F. Burkhardt
John G. Zeller,
Inventor
By Wilhelm Bonner
Attorneys.

UNITED STATES PATENT OFFICE.

JOHN G. ZELLER, OF RICHMOND, INDIANA, ASSIGNOR TO THE UNITED STATES BAKING COMPANY, OF PITTSBURG, PENNSYLVANIA.

CONVEYER.

SPECIFICATION forming part of Letters Patent No. 510,626, dated December 12, 1893.

Application filed June 26, 1893. Serial No. 478,827. (No model.)

*To all whom it may concern:*

Be it known that I, JOHN G. ZELLER, a citizen of the United States, residing at Richmond, in the county of Wayne and State of Indiana, have invented new and useful Improvements in Conveyers, of which the following is a specification.

This invention relates to a conveyer for carrying pans, boxes or trays from one floor of a building to another, and has the object to produce a conveyer in which the flights are firmly held in place and which permits the pans, boxes or trays to be placed upon and removed from the conveyer in a convenient and expeditious manner.

In the accompanying drawings consisting of three sheets:—Figure 1 is a vertical transverse section of my improved conveyer, adapted for carrying bakers' pans, the section being taken in line 1—1, Fig. 2. Fig. 2 is a vertical longitudinal section at right angles to Fig. 1, being taken in line 2—2, of said figure. Fig. 3 is a horizontal section in line 3—3, Fig. 1. Fig. 4 is a fragmentary vertical section, on an enlarged scale, showing the guide of the conveyer belt. Fig. 5 is a horizontal section in line 5—5, Fig. 4. Fig. 6 is a fragmentary vertical section of the conveyer, similar to Fig. 1, showing the unloading mechanism arranged near the upper end of the conveyer.

Like letters of reference refer to like parts in the several figures.

The main frame of the conveyer consists essentially of four posts A, longitudinal bars B B' connecting the upper and lower ends of the posts, and the transverse cross bars C C' connecting the ends of the longitudinal bars.

D D' represent two pairs of endless belts which are arranged vertically with the carrying portions of one pair of belts facing those of the other pair, and separated therefrom by an intervening space. These belts consist, preferably, of chain links and pass with their upper portions around sprocket wheels $d\ d'$ mounted on transverse shafts E E', which latter are journaled in bearings $e\ e'$ arranged on the upper longitudinal bars B. The lower portions of the belts pass around sprocket wheels G G', mounted on transverse shafts $g\ g'$, which latter are journaled in bearings $f\ f'$, arranged on the lower longitudinal bars B'.

$h$ represents outwardly projecting wings or flights formed on the belts, preferably on alternate links. The wings of each pair of belts are connected by transverse angle irons or plates forming continuous horizontal supports or shelves $i$, which support the ends of the pans I, and upright guards $i'$ which prevent the pans from moving laterally. The sprocket wheels supporting the two pairs of belts are connected by any suitable and ordinary driving gear so that both sets of belts move with their carrying portions in the same direction and at the same speed. As shown in Figs. 1 and 2, the carrying portions of both sets of belts move downwardly, in which case the pans are placed upon the conveyer at its upper end and discharged at its lower end. By extending the shelves of each set of belts from one belt to the other they form continuous supports which enable the operator easily to slide the pans into place upon the conveyer, and they also permit pans of different widths to be used.

In order to prevent the shelves from being tilted by the weight of the pans and their contents, the carrying portions of the belts are held in place by vertical guides J. Each of these guides consists of a rectangular tube through which the chain links pass lengthwise, and which is provided with a longitudinal slot $j$ on its inner side through which the wings of the chain links pass. The chain links fit in the tubular guides sufficiently snug to prevent them from tilting, thereby holding the shelves in the proper position for carrying the pans. The guide bars J are supported by brackets $k$ arranged on the upright posts.

The pans are automatically removed from the conveyer shelves by an unloading mechanism which is constructed as follows:—L represents two endless discharge belts which are arranged transversely between the lower portions of the two pairs of conveyer belts, and which pass around sprocket wheels $l\ l'$ mounted on longitudinal shafts $m\ m'$, which latter are journaled in bearings $n$ arranged on the posts of the main frame. These discharge belts are provided with outwardly projecting fingers o which are adapted to engage against the ends of the pans as the latter approach the discharge belts and unload or push the same from the shelves upon endless carrying belts P. The latter pass with their receiving portions around sprocket wheels p arranged adjacent to the delivery portions of the discharge belts, and mounted on a longitudinal shaft q, which latter is journaled in bearings q' supported on the main frame. The carrying belts deliver the pans to the operators who remove the goods therefrom and pack the same. R represents tubular guides whereby the upper or operative portions of the discharge belts are held in position, so that the fingers are held against tipping and caused to engage properly against the edges of the pans. These guides are constructed in the same manner as the guides of the conveyer belts, being each provided with a longitudinal slot through which the fingers project. The guides R are supported by brackets r secured to the posts of the main frame. While the pans are being shoved off the conveyer shelves by the fingers of the discharge belts, the pans continue to descend with the conveyer belts. In order to prevent the pans from being tilted toward the carrying belts P during this operation, the upper operative portions of the discharge belts are inclined from their receiving end toward their delivery end at such an angle and the travel of the belts is so timed, relatively to the movement of the pan shelves, that their fingers descend in the same measure as the pans.

When it is desired to elevate the pans from a lower to an upper floor, the dischaage belts are arranged between the upper portions of the two sets of conveyer belts, as represented in Fig. 6. In this construction, the lower portion of the discharge belts are in their operative position, so that the latter rise from their receiving ends toward their delivery ends. The tubular guides are in this case applied to such lower portions.

I claim as my invention—

1. The combination with two opposing sets of endless belts moving in the same direction, and provided with projecting flights, of tubular guides for such belts having longitudinal slots in their front walls through which said flights extend and closed rear sides which resist outward deflection of the belts, and continuous shelves connecting the projecting flights of the adjacent belts, substantially as set forth.

2. The combination with two opposing endless conveyer belts, moving in the same direction, of shelves attached to the conveyer belts and adapted to support trays, pans or boxes, a discharge belt arranged between the two sets of conveyer belts and provided with fingers, whereby the pans, trays or boxes are removed from the shelves, and a tubular guide having a slot for the passage of said fingers and a closed inner side, whereby the operative portion of the discharge belt is held in place substantially as set forth.

3. The combination with two opposing sets of endless conveyer belts moving in the same direction, of shelves attached to the conveyer belts, and an inclined discharge belt arranged transversely between the two sets of conveyer belts and provided with one or more projecting fingers adapted to engage against the pans or other articles placed upon the shelves, the discharge belt being inclined at such an angle and its movement being so timed that its fingers descend at the same speed as the pans, substantially as set forth.

Witness my hand this 10th day of June, 1893.

JOHN G. ZELLER.

Witnesses:
FRANK M. CONNER,
HENRY LEIBHARDT,
ELSWORTH FENTON.